US009244271B2

(12) United States Patent
Wu

(10) Patent No.: US 9,244,271 B2
(45) Date of Patent: Jan. 26, 2016

(54) MINIATURE PROJECTION DEVICE FOR EMITTING LASER BEAMS

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 168 days.

(21) Appl. No.: 14/092,936

(22) Filed: Nov. 28, 2013

(65) Prior Publication Data

US 2014/0347638 A1    Nov. 27, 2014

(30) Foreign Application Priority Data

May 23, 2013  (TW) .................................. 102118220

(51) Int. Cl.
| | |
|---|---|
| G03B 21/14 | (2006.01) |
| G02B 26/10 | (2006.01) |
| H04N 9/31 | (2006.01) |
| G02B 7/00 | (2006.01) |
| G02B 26/08 | (2006.01) |

(52) U.S. Cl.
CPC ............ *G02B 26/101* (2013.01); *H04N 9/3129* (2013.01); *H04N 9/3173* (2013.01); *G02B 7/005* (2013.01); *G02B 26/0841* (2013.01)

(58) Field of Classification Search
CPC . H04N 9/3135; H04N 9/3161; G02B 6/3518; G02B 26/0833; G02B 6/3584; G02B 6/3656; G02B 21/14
See application file for complete search history.

(56) References Cited

U.S. PATENT DOCUMENTS

2007/0272792 A1*  11/2007  Laor et al. ..................... 244/3.16
2012/0327130 A1*  12/2012  Lin ................................ 345/690

* cited by examiner

*Primary Examiner* — William C Dowling
*Assistant Examiner* — Magda Cruz
(74) *Attorney, Agent, or Firm* — Novak Druce Connolly Bove + Quigg LLP

(57) ABSTRACT

A miniature projection device includes a rotatable bracket assembly, a rotating plate, a driving device, and a light source unit. The rotating plate is rotatably mounted to the rotatable bracket assembly. The driving device is configured to drive the rotatable bracket assembly to rotate in a first direction, and to drive the rotating plate to rotate in a second direction. The first direction is substantially perpendicular to the second direction. The light source unit is mounted on the rotatable plate and is capable of rotating together with the rotating plate. The light source unit is configured to emit laser beams and to project the laser beams onto a screen.

12 Claims, 1 Drawing Sheet

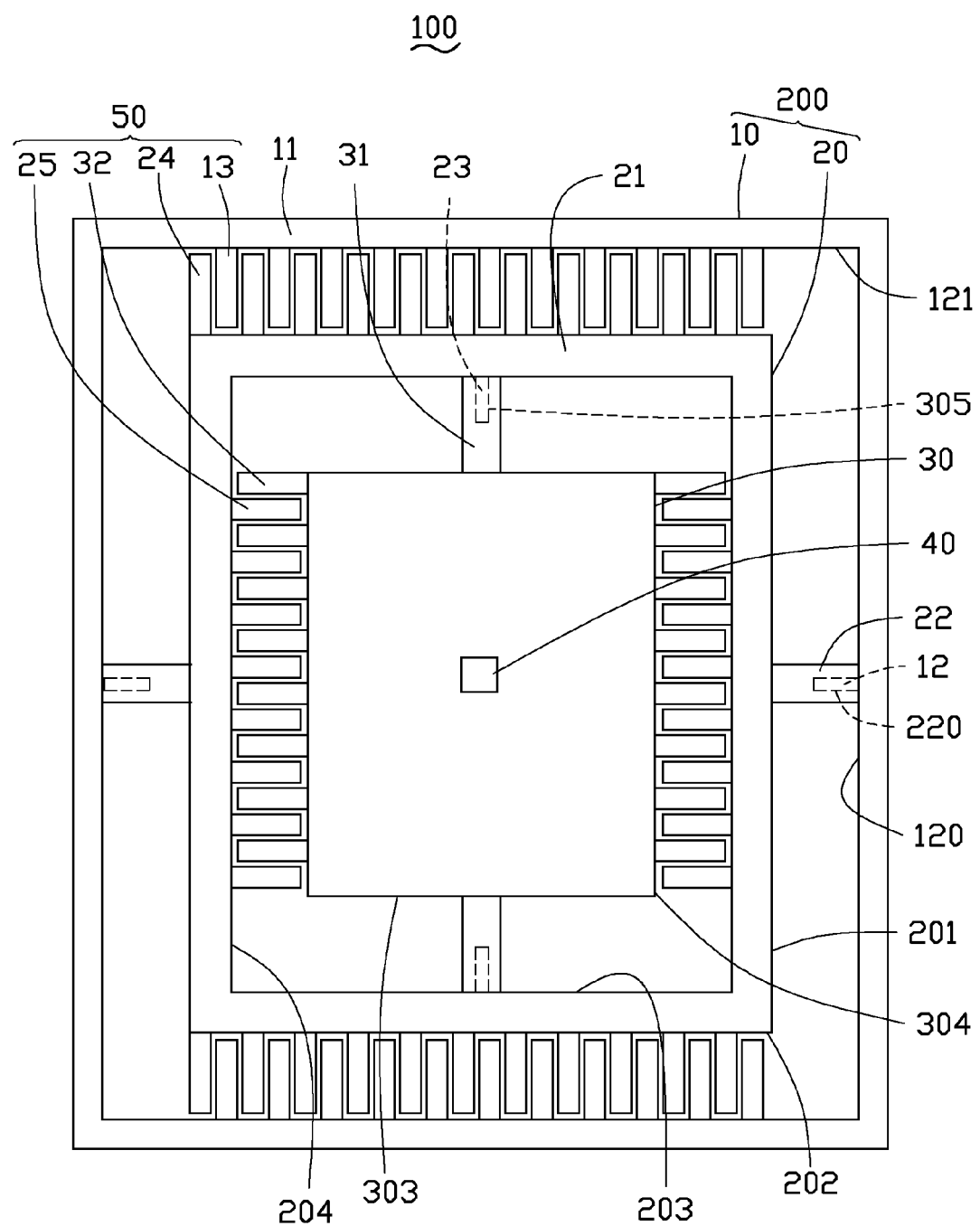

MINIATURE PROJECTION DEVICE FOR EMITTING LASER BEAMS

BACKGROUND

1. Technical Field

The present disclosure relates to projection devices, and particularly to a miniature projection device.

2. Description of Related Art

Laser projection devices are becoming more and more popular due to their having a larger color gamut, a higher brightness, a higher contrast ratio, and a better saturation. A MEMS mirror device mounted in the laser projection device is configured for reflecting laser beams emitted by a light source onto a screen. However, a size of the MEMS mirror device is very large, which is undesirable for miniaturizing the laser projection devices.

Therefore, it is desirable to provide a miniature projection device that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a schematic view of an embodiment of a miniature projection device.

DETAILED DESCRIPTION

The FIGURE shows a miniature projection device 100 configured to emit laser beams and to project the laser beams onto a screen (not shown). The miniature projection device 100 includes a rotatable bracket assembly 200, a rotatable plate 30, a light source unit 40, and a driving device 50. The rotatable bracket assembly 200 includes a first rotatable bracket 10 and a second rotatable bracket 20 rotatably received in the rotatable bracket 10. The rotatable plate 30 is rotatably received in the second rotatable bracket 20. The light source unit 40 is mounted on the rotatable plate 30 and is rotatable with the rotatable plate 30. The driving device 50 is configured to drive the rotatable bracket assembly 200 and the rotatable plate 30 to rotate. In the embodiment, the driving device 50 includes a number of first electrodes 13, a number of second electrodes 24, a number of third electrodes 25, and a number of fourth electrodes 32.

The first rotatable bracket 10 is substantially rectangular and formed by four first connection poles 11. The first rotatable bracket 10 includes two oppositely facing first inner side surfaces 120 and two oppositely facing second inner side surfaces 121. The first inner side surfaces 120 are substantially perpendicular to the second inner side surfaces 121. In the embodiment, the first rotatable bracket 10 includes two first rotation shafts 12. Each first rotation shaft 12 is mounted to a central portion of a corresponding first inner side surface 120. Each first rotation shaft 12 extends toward the second rotatable bracket 20. The first rotation shafts 12 allow the second rotatable bracket 20 to rotate along a first direction. The first electrodes 13 are mounted on the two second inner side surfaces 121.

The second rotatable bracket 20 is also substantially rectangular and formed by four second connection poles 21. A size of the second rotatable bracket 20 is smaller than a size of the first rotatable bracket 10. The second rotatable bracket 20 includes two first outer side surfaces 201 and two second outer side surfaces 202. The two first outer side surfaces 201 are substantially parallel to each other, and each first outer side surface 201 faces a corresponding first inner side surface 120. The two second outer side surfaces 202 are substantially parallel to each other, and each second outer side surface 202 faces a corresponding second inner side surface 121.

In the embodiment, the second rotatable bracket 20 includes two first sleeve shafts 22. Each first sleeve shaft 22 is mounted to a central portion of a corresponding first outer side surface 201 and extends toward and connects to a corresponding first inner side surface 120. Each first sleeve shaft 22 defines a first mounting hole 220 for receiving the corresponding first rotation shaft 12.

The second electrodes 24 are mounted on the two second outer side surfaces 202. Each second electrode 24 is located between two first electrodes 13, and each first electrode 13 is located between two neighboring second electrodes 24.

The second rotatable bracket 20 includes two oppositely facing third inner side surfaces 203 and two oppositely facing fourth inner side surfaces 204. In the embodiment, the second rotatable bracket 20 includes two second rotation shafts 23. Each second rotation shaft 23 is mounted to a central portion of a corresponding third inner side surface 203. Each second rotation shaft 23 extends toward the rotatable plate 30. The second rotation shafts 23 allow the rotatable plate 30 to rotate along a second direction. Axes of the second rotation shafts 23 are substantially perpendicular to axes of the first rotation shafts 12.

The third electrodes 25 are mounted on the two fourth inner side surfaces 204.

The rotatable plate 30 is substantially rectangular. A size of the rotatable plate 30 is smaller than the size of the second rotatable bracket 20. The rotatable plate 30 includes two third outer side surfaces 303 and two fourth outer side surfaces 304. The two third outer side surfaces 303 are substantially parallel to each other, and each third outer side surface 303 faces a corresponding third inner side surface 203. The two fourth outer side surfaces 304 are substantially parallel to each other, and each fourth outer side surface 304 faces a corresponding fourth inner side surface 204.

In the embodiment, the rotatable plate 30 includes two second sleeve shafts 31. Each second sleeve shaft 31 is mounted to a central portion of a corresponding third outer side surface 203 and extends toward and connects to a corresponding third inner side surface 203. Each first sleeve shaft 22 defines a first mounting hole 220 for receiving the corresponding first rotation shaft 12. Each second sleeve shaft 31 defines a second mounting hole 305 for receiving a corresponding second rotation shafts 23.

The fourth electrodes 32 are mounted on the two fourth outer side surfaces 304. Each fourth electrode 32 is located between two neighboring third electrodes 25, and each third electrode 25 is located between two neighboring fourth electrodes 32.

A size of the light source unit 40 is smaller than the size of the rotatable plate 30. The light source unit 40 is located on the rotatable plate 30 and configured to emit laser beams onto the screen.

In use, first electrostatic forces generated by the first electrodes 13 and the second electrodes 24 drive the second rotatable bracket 20 to rotate relative to the first rotatable bracket 10 along the first direction. Second electrostatic forces generated by the third electrodes 25 and the fourth electrodes 32 drive the rotatable plate 30 to rotate in the second rotatable bracket 20 along the second direction. The second direction is substantially perpendicular to the first direction. As such, the rotatable plate 30 can be rotated in two directions in the first rotatable bracket 10. As the light source unit 40 is mounted on the rotatable plate 30, a direction of emitted light can be changed according to the rotation of the rotatable plate 30.

In other embodiments, shapes of the first rotatable bracket 10, the second rotatable bracket 20, and the rotatable plate 30 can be changed according to actual needs.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A miniature projection device, comprising:
    a rotatable bracket assembly comprising a first rotatable bracket and a second rotatable bracket;
    a rotatable plate;
    a driving device configured to drive the rotatable bracket assembly in a first direction, and to drive the rotatable plate to rotate in a second direction, the first direction substantially perpendicular to the second direction; and
    a light source unit mounted on the rotatable plate and capable of rotating together with the rotatable plate, the light source unit configured to emit laser beams and to project the laser beams onto a screen;
    wherein the second rotatable bracket is rotatably received in the first rotatable bracket and rotatably coupled to the first rotatable bracket by two first sleeve shafts, and the rotatable plate is rotatably received in the second rotatable bracket and rotatably coupled to the second rotatable bracket by two second sleeve shafts.

2. The miniature projection device of claim 1, wherein the second rotatable bracket is capable of rotating in the first rotatable bracket, along the first direction, and the rotatable plate is capable of rotating in the second rotatable bracket, along the second direction.

3. The miniature projection device of claim 2, wherein the first rotatable bracket is substantially rectangular, the first rotatable bracket comprises two oppositely first facing inner side surfaces and two first rotation shafts, each first rotation shaft mounted to a corresponding first inner side surface, each first rotation shaft extends toward the second rotatable bracket, the second rotatable bracket comprises two first outer side surfaces, each first outer side surface faces a corresponding first inner side surface, each first sleeve shaft is mounted to a corresponding first outer side surface and extends toward and connects to a corresponding first inner side surface, each first sleeve shaft defines a first mounting hole receiving the corresponding first rotation shaft.

4. The miniature projection device of claim 3, wherein the first rotatable bracket comprises two oppositely second facing inner side surfaces substantially perpendicular to the first inner side surfaces, the driving device comprises a plurality of first electrodes and a plurality of second electrodes, the first electrodes are mounted on the two second inner side surfaces, the second rotatable bracket comprises two second outer side surfaces, the two second outer side surfaces are substantially parallel to each other, each second outer side surface faces a corresponding second inner side surface, the second electrodes are mounted on the two second outer side surfaces, each second electrode is located between two neighboring first electrodes, and each first electrode is located between two neighboring second electrodes, first electrostatic forces generated by the first electrodes and the second electrodes drive the second rotatable bracket to rotate relative to the first rotatable bracket, along the first direction.

5. The miniature projection device of claim 3, wherein the first rotatable bracket is formed by four first connection poles.

6. The miniature projection device of claim 3, wherein the second rotatable bracket is formed by four second connection poles.

7. The miniature projection device of claim 2, wherein the second rotatable bracket comprises two oppositely third facing inner side surfaces and two second rotation shafts, each second rotation shaft extends from the third inner side surfaces, the rotatable plate comprises two third outer side surfaces, each third outer side surface faces a corresponding third inner side surface, each second sleeve shaft is mounted to a corresponding third outer side surface and extends toward and connects to a corresponding third inner side surface, each second sleeve shaft defines a first mounting hole receiving the corresponding first rotation shaft.

8. The miniature projection device of claim 7, wherein the second rotatable bracket comprises two oppositely fourth facing inner side surfaces substantially perpendicular to the third inner side surfaces, the driving device comprises a plurality of third electrodes and a plurality of fourth electrodes, the second electrodes are mounted on the two fourth inner side surfaces, the rotatable plate comprises two fourth outer side surfaces, the two fourth outer side surfaces are substantially parallel to each other, each fourth outer side surface faces a corresponding fourth inner side surface, the fourth electrodes are mounted on the two fourth outer side surfaces, each fourth electrode is located between two neighboring third electrodes, and each third electrode is located between two neighboring fourth electrodes, second electrostatic forces generated by the third electrodes and the fourth electrodes drive the rotatable plate to rotate relative to the second rotatable bracket, along the second direction.

9. A miniature projection device comprising:
    a rotatable bracket assembly comprising a first rotatable bracket and a second rotatable bracket;
    a rotatable plate;
    a driving device configured to drive the rotatable bracket assembly in a first direction, and to drive the rotatable plate to rotate in a second direction, the first direction substantially perpendicular to the second direction; and
    a light source unit mounted on the rotatable plate and capable of rotating together with the rotatable plate, the light source unit configured to emit laser beams and to project the laser beams onto a screen;
    wherein the first rotatable bracket is substantially rectangular and comprises two oppositely first facing inner side surfaces and two first rotation shafts, each first rotation shaft mounted to a corresponding first inner side surface, each first rotation shaft extends toward the second rotatable bracket, the second rotatable bracket comprises two first outer side surfaces, each first outer side surface faces a corresponding first inner side surface, the second rotatable bracket comprises two first sleeve shafts, each first sleeve shaft is mounted to a corresponding first outer side surface and extends toward and connects to a corresponding first inner side surface, each first sleeve shaft defines a first mounting hole receiving the corresponding first rotation shaft.

10. The miniature projection device of claim 9, wherein the first rotatable bracket comprises two oppositely second facing inner side surfaces substantially perpendicular to the first inner side surfaces, the driving device comprises a plurality of first electrodes and a plurality of second electrodes, the first electrodes are mounted on the two second inner side surfaces, the second rotatable bracket comprises two second outer side surfaces, the two second outer side surfaces are substantially parallel to each other, each second outer side surface faces a corresponding second inner side surface, the second electrodes are mounted on the two second outer side surfaces, each second electrode is located between two neighboring first electrodes, and each first electrode is located between two neighboring second electrodes, first electrostatic forces generated by the first electrodes and the second electrodes drive the second rotatable bracket to rotate relative to the first rotatable bracket, along the first direction.

11. The miniature projection device of claim 10, wherein the second rotatable bracket comprises two oppositely third facing inner side surfaces and two second rotation shafts, each second rotation shaft extends from the third inner side surfaces, the rotatable plate comprises two third outer side surfaces, each third outer side surface faces a corresponding third inner side surface, the rotatable plate comprises two second sleeve shafts, each second sleeve shaft is mounted to a corresponding third outer side surface and extends toward and connects to a corresponding third inner side surface, each second sleeve shaft defines a first mounting hole receiving the corresponding first rotation shaft.

12. The miniature projection device of claim 11, wherein the second rotatable bracket comprises two oppositely fourth facing inner side surfaces substantially perpendicular to the third inner side surfaces, the driving device comprises a plurality of third electrodes and a plurality of fourth electrodes, the second electrodes are mounted on the two fourth inner side surfaces, the rotatable plate comprises two fourth outer side surfaces, the two fourth outer side surfaces are substantially parallel to each other, each fourth outer side surface faces a corresponding fourth inner side surface, the fourth electrodes are mounted on the two fourth outer side surfaces, each fourth electrode is located between two neighboring third electrodes, and each third electrode is located between two neighboring fourth electrodes, second electrostatic forces generated by the third electrodes and the fourth electrodes drive the rotatable plate to rotate relative to the second rotatable bracket, along the second direction.

* * * * *